Patented Sept. 16, 1924.

1,509,087

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PROCESS OF MAKING BUTTER FROM MILK OIL.

No Drawing.    Application filed March 28, 1924.    Serial No. 702,569.

*To all whom it may concern:*

Be it known that I, CHARLES E. NORTH, a citizen of the United States of America, residing at Montclair, in the county of Essex and State of New Jersey, have invented certain new and useful Improvements in Processes of Making Butter from Milk Oil, of which the following is a full, clear, and exact description.

In an application of even date I have set forth a novel method of making butter from milk oil without churning, which for the information necessary for an understanding of the present case may be briefly described as follows:

Pure milk oil is mixed with skim milk in powdered form and water in such proportions, at a temperature above the melting point of the fat, as to produce an emulsified paste with a high fat concentration. This mixture is then stirred until the fat globules are reduced to the size of those which exist in normal milk or cream, then cooled to the temperature at which such globules have a tendency to agglomerate, and while at this temperature is pressed or squeezed or rubbed to bring the already closely approximated globules into actual contact with the result that they are immediately agglomerated, the excess buttermilk discharged, and a pure and high grade butter produced.

At the present time no other process of obtaining butter from any kind of milk or cream is practiced and perhaps known than the time honored process of churning. The necessity for the use of some form of churn in butter making on a large commercial scale imposes certain restrictions on the industry, which all add to the cost of the finished product. Chief of these is the practice which has developed of locating butter making establishments, known as centralizers, at central points in large cream producing territories within reach of numerous cream gathering stations for collecting cream from dairy farms, and which is usually received in a sour condition and which after periodical shipment to the centralizers is there treated, when necessary, churned and shipped as tub butter to the centers of consumption and distribution.

It is quite possible to make what is known as reconstructed cream by the emulsification of fat obtained from butter or from pure milk oil, by mixing such fat or oil in a melted state with a milk fluid such as whole milk, skim milk, or milk prepared by mixing water and milk powder, in proper proportions, and passing the mixture through some form of mechanical emulsifying machine. These machines, however, do not produce reconstructed cream with fat globules of uniform size, as a result of which the emulsions are of unstable character and likely to break and separate to a considerable extent, after standing a few hours. In such reconstructed cream the fat globules are of widely varying sizes and the excess of minute globules mingled with those of larger sizes has rendered the churning of such cream so difficult that the best authorities on butter making are agreed that no method of producing butter by churning reconstructed cream is commercially practicable or successful. In the first place such churning requires an abnormally long period of time. Again, the numerous minute fat globules are not agglomerated by normal churning, with the result that an excessive amount of fat is lost in the butter milk and the churning is not sufficiently exhaustive to prevent this loss.

Milk oil may now be readily and cheaply produced from milk or cream at any place, particularly at butter factories or centralizers, and it is manifestly most desirable on the score of economy to provide some way in which this oil can be made at such points and shipped to one or more central points and there converted into high grade or good butter, by some other method even more economical and effective than that involving the use of a churn. This problem, I believe, I have successfully solved.

By the use of pure milk oil I may produce a reconstructed cream having any fat concentration desired. It is not possible to produce natural cream of such high fat concentration by any of the separators on the market, as these are not designed nor intended to produce a cream having a fat concentration greater than from 20 to 50 per cent, to meet the demands of the general market and that of the butter industry in particular, which requires 35 per cent. I therefore produce a reconstructed cream with a fat concentration far above that required for ordinary butter making by mixing milk oil with milk, skim milk, or artificial milk, heating the mixture to a temperature above the melting point of the fat, and passing it at such temperature through any form of mechanical emulsor. For example, I may make a mixture of melted milk fat or milk oil with milk, natural or artificial, with fat concentrations ranging from 50 to 80 per cent, and emulsify such mixture by passing it through an ordinary mechanical emulsor, the product on cooling forming a thick and viscous paste, which varies in consistency according to the concentration of fat. These pastes when cooled below 65° F. are not fluid but semisolid.

It is recognized that the fat globules in normal milk are of such size that when their number is such as to bring their surfaces just into contact with each other, they will occupy approximately 80 per cent of the space in the vessel in which they are contained, the remaining 20 per cent being accounted for by the unfilled spaces existing between the globules. In carrying out my new process of butter making I aim to produce a concentrated cream or paste in which this condition of contact practically exists. For example, if I produce in the manner herein set forth a reconstructed cream having a fat concentration of 60 per cent or over, the fat globules in such paste, though in emulsified form, will be in far closer proximity to one another than those of the 35 per cent cream ordinarily used for churning by the butter industry.

After I have produced such a concentrated cream by the use of a mechanical emulsor, I maintain it in an entirely uniform and homogeneous condition by slow and gentle stirring until by any convenient means it is cooled to a temperature below 65° F., at which the fat globules have a tendency to adhere or agglomerate. At such temperature, by reason of the close approximation of the surfaces of the fat globules, the adherence or agglomeration of these may be quickly and easily brought about by the exertion of a simple pressure on such paste, and this is attended by the immediate discharge of any excess of buttermilk that occupies the spaces between the globules.

The concentration of the fat globules in such pastes makes the agglomeration of all of the fat exceedingly easy as compared with the attempts heretofore made to produce a like result by the ordinary churning of reconstructed cream. Such pastes are in a semi-solid or gummy condition, which makes all of the fat readily accessible to the action of any instrumentality such as a paddle or roller or the like which may be used for squeezing or pressing every part of the substance. Approximately all of the fat may be immediately pressed together or squeezed so that complete agglomeration takes place. The emulsification of the reconstructed cream approximating the condition of normal cream imparts to the finished product the grain or texture characteristic of natural butter.

After the cooled paste has been pressed or squeezed to agglomerate all the fat and the greater part of the excess buttermilk discharged, the product may then be worked and washed just as in the usual process of butter making. During said working any desired flavoring or coloring matter may be applied or the butter salted in the usual manner.

The time required for the production of cream having such high fat concentrations is negligible as the emulsors used operate at high speeds and have very large capacities. The time required for cooling the emulsion is also very short, and may be accomplished by simply stirring the material in a vessel standing in ice water or otherwise and should not require more than five or ten minutes. In some cases good commercial conditions may render it desirable to allow such pastes to slowly cool for an interval between the emulsification and the butter making, provided the material be maintained in a uniform or homogeneous condition. The agglomeration of the fat by pressure or squeezing may be described as instantaneous, as this occurs immediately upon the application of force and is attended by the discharge of the excess buttermilk.

In order that no uncertainty as to the exact nature of this process may exist I give in detail a procedure by following which any one may produce on any scale pure perfectly sanitary and high grade butter.

Mix 60 parts of pure milk oil at a temperature of 140° F. with 40 parts of fluid milk, skim milk, or artificial milk at the same temperature. This mixture should be constantly stirred in order to keep the same as uniform as possible. Run this mixture through any standard type of mechanical emulsifying machine operating at a speed recognized as proper for producing reconstructed cream. The thick concentrated emulsified fat thus produced should be stirred to maintain its homogeneous condition and cooled in any simple manner as by standing in a tank surrounded by ice water until it reaches a temperature of 60° F. When in this condition simple pressure of a spoon, a paddle, a roller, or the like will result in the rapid, almost instantaneous agglomeration of the fat particles and the discharge of the excess buttermilk. The product may then be washed and worked like ordinary butter, and salt or any flavoring or coloring matter worked into it. The result will be as fine a quality of butter as can be made.

The distinction between this and the process described in my application hereinbefore referred to, will be manifest. The present application deals with emulsion of milk oil with milk, or its equivalent, that is, skim milk or artificially prepared milk, and does not necessarily involve the use of dried skim milk powder directly as one element in producing the emulsion. Some butter makers, for example, while very desirous of utilizing milk oil for the making of butter, object to the use of milk powder, either on account of its cost, difficulty of obtaining it in a proper condition, or otherwise. I have herein set forth how emulsions produced by mixtures of milk oil and milk fluid may be utilized and my claims are limited to this product.

As one essential step in the present process I have described the emulsification of the mixture by passing it through a mechanical emulsor, and this is manifestly the best method. The invention, however, is not limited to the use of such a device, but includes the emulsification of the oil and a fluid such as milk in any other way.

What I claim as my invention is:

1. The process of making butter from milk oil, which consists in emulsifying milk fat or oil and milk fluid at a temperature above the melting point of the fat to produce a reconstructed cream or milk oil emulsion having a high fat concentration, cooling the emulsion to a temperature at which the fat has a tendency to agglomerate, and then pressing or squeezing the same to effect such agglomeration and the discharge of the excess buttermilk.

2. The process of making butter from milk oil, which consists in mixing the oil with such an emulsifying agent as milk fluid, natural or artificial, at a temperature above the melting point of the fat and in proportions to produce a reconstructed cream in which the fat globules are in very close approximation, passing the mixture through a mechanical emulsor, then cooling the emulsion to a temperature at which the fat has a tendency to agglomerate, and then securing such agglomeration by pressure.

3. The process of making butter from milk oil, which consists in forming an emulsion of such oil and milk fluid at a temperature above the melting point of the fat, and having a fat concentration above 50 per cent, cooling such emulsion to a temperature at which the fat has a tendency to agglomerate, and effecting such agglomeration at such temperature by pressure.

4. The process of making butter from milk oil, which consists in forming an emulsion of such oil and fluid milk at a temperature above the melting point of the fat and having a fat concentration above 50 per cent, stirring the emulsion to preserve it in homogeneous condition, cooling it to a temperature at which the fat has a tendency to agglomerate, and effecting such agglomeration by pressure.

5. The process of making butter from milk oil without churning, which consists in producing an emulsion of milk oil and milk fluid of such high fat concentration that the fat globules are in very close approximation, cooling such emulsion to a temperature below 65° F. and at such temperature, by simple pressure or squeezing, effecting the agglomeration of the fat whereby practically all of the fat is recovered in the form of butter without excessive losses in the discharged buttermilk.

6. The process of making butter from milk oil without churning, which consists in mixing milk oil and milk fluid in proportions to form an emulsion of very high fat concentration, cooling the mixture to a temperature at which the fat has a tendency to agglomerate and applying thereto pressure, such as by stirring, during the cooling whereby the fat is agglomerated and the buttermilk discharged.

In testimony whereof I hereto affix my signature.

CHARLES E. NORTH.